(12) United States Patent
Strock et al.

(10) Patent No.: US 10,794,394 B2
(45) Date of Patent: Oct. 6, 2020

(54) ABRASIVE TIP FOR COMPOSITE FAN BLADES

(71) Applicant: United Technologies Corporation, Hartford, CT (US)

(72) Inventors: Christopher W. Strock, Kennebunk, ME (US); James O. Hansen, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 742 days.

(21) Appl. No.: 14/687,660

(22) Filed: Apr. 15, 2015

(65) Prior Publication Data
US 2016/0305442 A1 Oct. 20, 2016

(51) Int. Cl.
*F01D 5/28* (2006.01)
*F04D 29/38* (2006.01)
(Continued)

(52) U.S. Cl.
CPC ............. *F04D 29/388* (2013.01); *C23C 4/12* (2013.01); *F01D 5/147* (2013.01); *F01D 5/282* (2013.01); *F01D 5/288* (2013.01); *F01D 11/122* (2013.01); *F04D 19/002* (2013.01); *F05D 2220/36* (2013.01); *F05D 2300/121* (2013.01);
(Continued)

(58) Field of Classification Search
CPC .... F04D 29/388; F04D 19/002; F04D 29/023; C23C 4/12; F01D 5/147; F01D 5/282; F01D 5/288; F01D 11/122; F01D 5/20; F01D 11/125; F01D 11/127; F01D 5/28; F01D 5/284; F01D 5/286; F05D 2220/36; F05D 2300/121; F05D 2300/133; F05D 2300/173; F05D 2300/2102; F05D 2300/211; F05D 2300/2112; F05D 2300/2118; F05D 2300/2282; F05D 2300/43; F05D 2300/434; F05D 2300/44; F05D 2300/506; F05D 2300/516; F05D 2300/603; F05D 2300/6032; Y02T 50/672; F05B 2230/90; F05B 2230/311; F05B 2230/31
USPC ......... 416/224, 229 R, 229 A, 241 R, 241 B; 415/173.4, 174.4
See application file for complete search history.

(56) References Cited

U.S. PATENT DOCUMENTS 4,671,735 A  6/1987 Rossmann et al.
4,735,656 A  4/1988 Schaefer et al.
(Continued)

FOREIGN PATENT DOCUMENTS

EP  0 496 550 A1  7/1992
EP  1681440 A2  7/2006
(Continued)

OTHER PUBLICATIONS

Rolland, "Spray Forming, Droplet Microstructure and Impingement Behavior", 1996, MIT (Year: 1996).*
(Continued)

*Primary Examiner* — Woody A Lee, Jr.
*Assistant Examiner* — Brian Christopher Delrue
(74) *Attorney, Agent, or Firm* — Bachman & LaPointe, P.C.

(57) ABSTRACT

A rotating component includes an airfoil section with a free end, the airfoil section being formed of a composite core with a metallic skin and an abrasive coating applied to the free end.

11 Claims, 7 Drawing Sheets

(51) Int. Cl.
 *F04D 19/00* (2006.01)
 *C23C 4/12* (2016.01)
 *F01D 5/14* (2006.01)
 *F01D 11/12* (2006.01)

(52) U.S. Cl.
 CPC .. *F05D 2300/133* (2013.01); *F05D 2300/173* (2013.01); *F05D 2300/211* (2013.01); *F05D 2300/2102* (2013.01); *F05D 2300/2112* (2013.01); *F05D 2300/2118* (2013.01); *F05D 2300/2282* (2013.01); *F05D 2300/43* (2013.01); *F05D 2300/434* (2013.01); *F05D 2300/44* (2013.01); *F05D 2300/506* (2013.01); *F05D 2300/516* (2013.01); *F05D 2300/603* (2013.01); *F05D 2300/6032* (2013.01); *Y02T 50/672* (2013.01)

(56) References Cited

U.S. PATENT DOCUMENTS

| | | | |
|---|---|---|---|
| 4,802,828 A * | 2/1989 | Rutz | F01D 5/20 29/889.71 |
| 4,854,196 A | 8/1989 | Mehan | |
| 5,076,897 A * | 12/1991 | Wride | B24D 99/00 205/110 |
| 5,141,400 A | 8/1992 | Murphy et al. | |
| 5,264,011 A | 11/1993 | Brown et al. | |
| 5,476,363 A | 12/1995 | Sohl et al. | |
| 5,551,840 A | 9/1996 | Benoit et al. | |
| 5,603,603 A * | 2/1997 | Benoit | F01D 11/12 277/415 |
| 5,952,110 A | 9/1999 | Schell et al. | |
| 6,434,876 B1 | 8/2002 | Wheat et al. | |
| 6,811,898 B2 | 11/2004 | Ohara et al. | |
| 6,967,304 B2 * | 11/2005 | Gevelber | B05B 12/082 219/121.47 |
| 8,556,579 B2 | 10/2013 | Jevons | |
| 8,616,847 B2 | 12/2013 | Allen et al. | |
| 8,807,955 B2 | 8/2014 | Wrabel et al. | |
| 2001/0055652 A1 * | 12/2001 | Dalzell, Jr. | F01D 11/122 427/447 |
| 2004/0170859 A1 * | 9/2004 | Darolia | C23C 28/02 428/635 |
| 2006/0046091 A1 * | 3/2006 | Madhava | C23C 10/58 428/689 |
| 2008/0286108 A1 | 11/2008 | Lui et al. | |
| 2010/0296939 A1 | 11/2010 | Jevons | |
| 2013/0004328 A1 | 1/2013 | Wrabel et al. | |
| 2016/0083830 A1 * | 3/2016 | Cheney | C22C 38/46 428/553 |
| 2016/0123159 A1 | 5/2016 | Thompson | |

FOREIGN PATENT DOCUMENTS

| | | |
|---|---|---|
| EP | 2 253 803 A2 | 11/2010 |
| EP | 2449216 A1 | 5/2012 |
| EP | 2 540 961 A2 | 1/2013 |
| EP | 3 015 646 A1 | 5/2016 |

OTHER PUBLICATIONS

Mahesh et al, "Modeling of droplet dynamic and thermal behaviour during spray", 2003, Indian Academy of Sciences (Year: 2003).*
European search report for application No. 16165603.8-1610 dated Jul. 15, 2016.
European Office action for application No. 16165603.8-1610 dated Aug. 16, 2017.

* cited by examiner

ABRASIVE TIP FOR COMPOSITE FAN BLADES

BACKGROUND

The present disclosure relates to rotating components for gas turbine engines and rub coatings therefor.

Abradable coatings often protect rotating parts during rub interaction with associated seals to establish a mating surface with the smallest possible clearance. The abradable coatings are often utilized to form abrasive tips of rotating blades, cantilevered vanes, and knife edge seals of gas turbine engines.

SUMMARY

A rotating component according to one disclosed non-limiting embodiment of the present disclosure can includes an airfoil section including a free end, the airfoil section being formed of a composite core with a metallic skin and an abrasive coating applied to the free end.

A further embodiment of the present disclosure may include, wherein an end of the composite core and an end of the metallic skin are covered by the abrasive coating.

A further embodiment of any of the foregoing embodiments of the present disclosure may include, wherein the metallic skin only partially surrounds the composite core.

A further embodiment of any of the foregoing embodiments of the present disclosure may include, wherein the metallic skin surrounds a leading edge of the composite core.

A further embodiment of any of the foregoing embodiments of the present disclosure may include, wherein the abrasive coating includes a metal matrix and hard particles dispersed through the metal matrix.

A further embodiment of any of the foregoing embodiments of the present disclosure may include, wherein the metal matrix and the metal-based material are compositionally composed of the same predominant metal.

A further embodiment of any of the foregoing embodiments of the present disclosure may include, wherein the metal is aluminum.

A further embodiment of any of the foregoing embodiments of the present disclosure may include, wherein the metallic skin sheathes a pressure side and a suction side of the composite core.

A further embodiment of any of the foregoing embodiments of the present disclosure may include wherein the abrasive coating forms an abrasive tip.

A further embodiment of any of the foregoing embodiments of the present disclosure may include, wherein the abrasive coating is bonded to the free end.

A further embodiment of any of the foregoing embodiments of the present disclosure may include 1, wherein the abrasive coating is thermal sprayed to the free e A fan blade according to another disclosed non-limiting embodiment of the present disclosure can include an airfoil section including a leading edge, a trailing edge, a pressure side, a suction side and a distal tip and a free end, the airfoil section being formed of a composite core with a metallic skin and an abrasive coating applied to the free end.

A further embodiment of any of the foregoing embodiments of the present disclosure may include, wherein the abrasive coating is bonded to the free end.

A further embodiment of any of the foregoing embodiments of the present disclosure may include, wherein the abrasive coating is thermal sprayed to the free end.

A further embodiment of any of the foregoing embodiments of the present disclosure may include, wherein an end of the composite core and an end of the metallic skin are covered by the abrasive coating.

A further embodiment of any of the foregoing embodiments of the present disclosure may include, wherein the metallic skin only partially surrounds the composite core.

A further embodiment of any of the foregoing embodiments of the present disclosure may include, wherein the metallic skin surrounds a leading edge of the composite core.

A method of fabricating a fan blade according to another disclosed non-limiting embodiment of the present disclosure can include forming an airfoil section including a free end, the airfoil section including a composite core with a metallic skin and applying an abrasive coating to the free end.

A further embodiment of any of the foregoing embodiments of the present disclosure may include, wherein the abrasive coating is bonded to the free end.

A further embodiment of any of the foregoing embodiments of the present disclosure may include, wherein the abrasive coating is thermal sprayed onto the free end.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
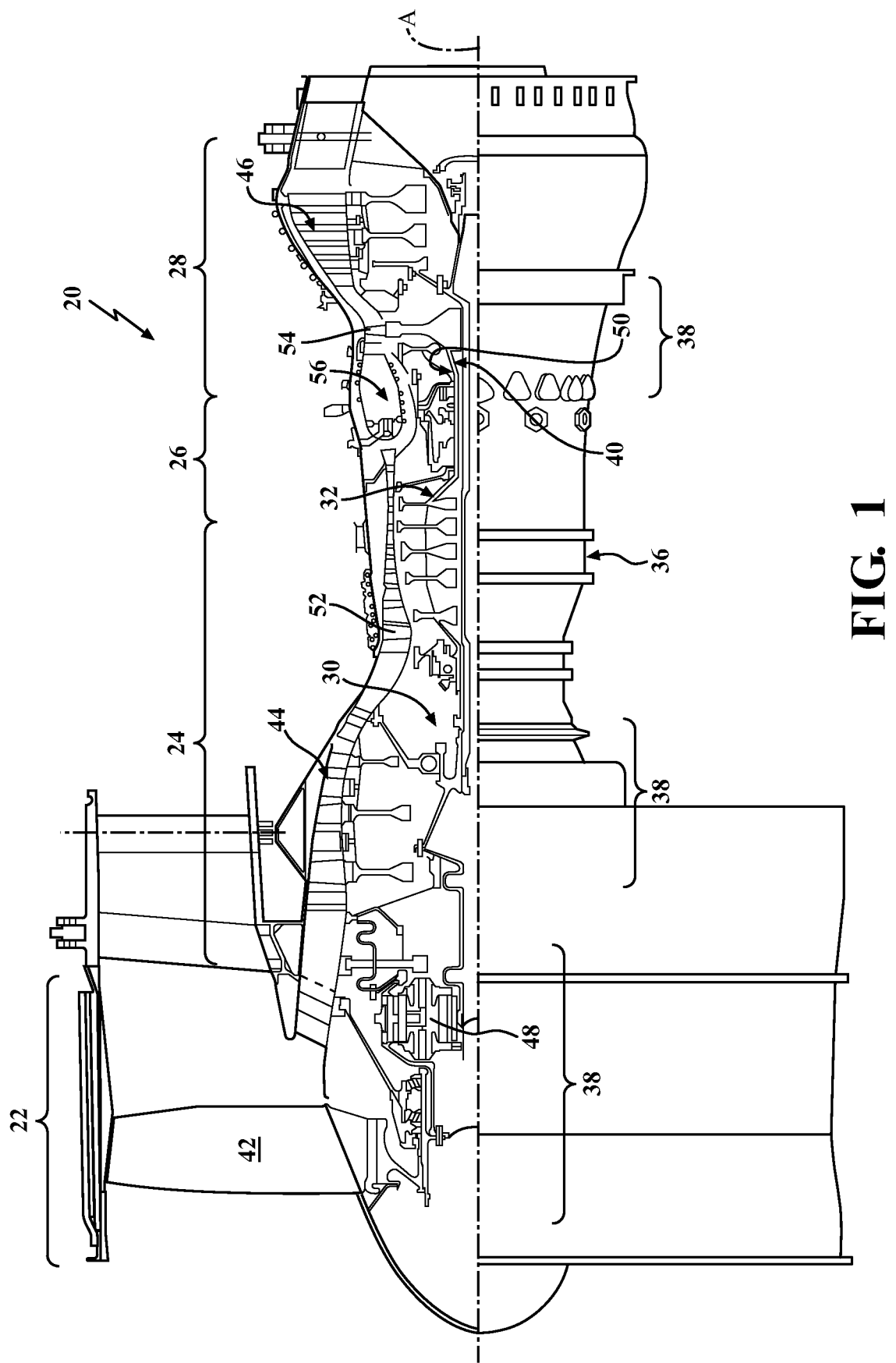
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36.

The engine 20, in one example, is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five.

In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption" (TSFC)—which is the industry standard parameter of lbm of fuel being burned divided by lbf of thrust the engine produces at that operating point. "low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]0.5$. The "Low corrected fan tip speed" as disclosed herein according to one non-limiting embodiment is less than about 1150 ft/second.

Figure 2:
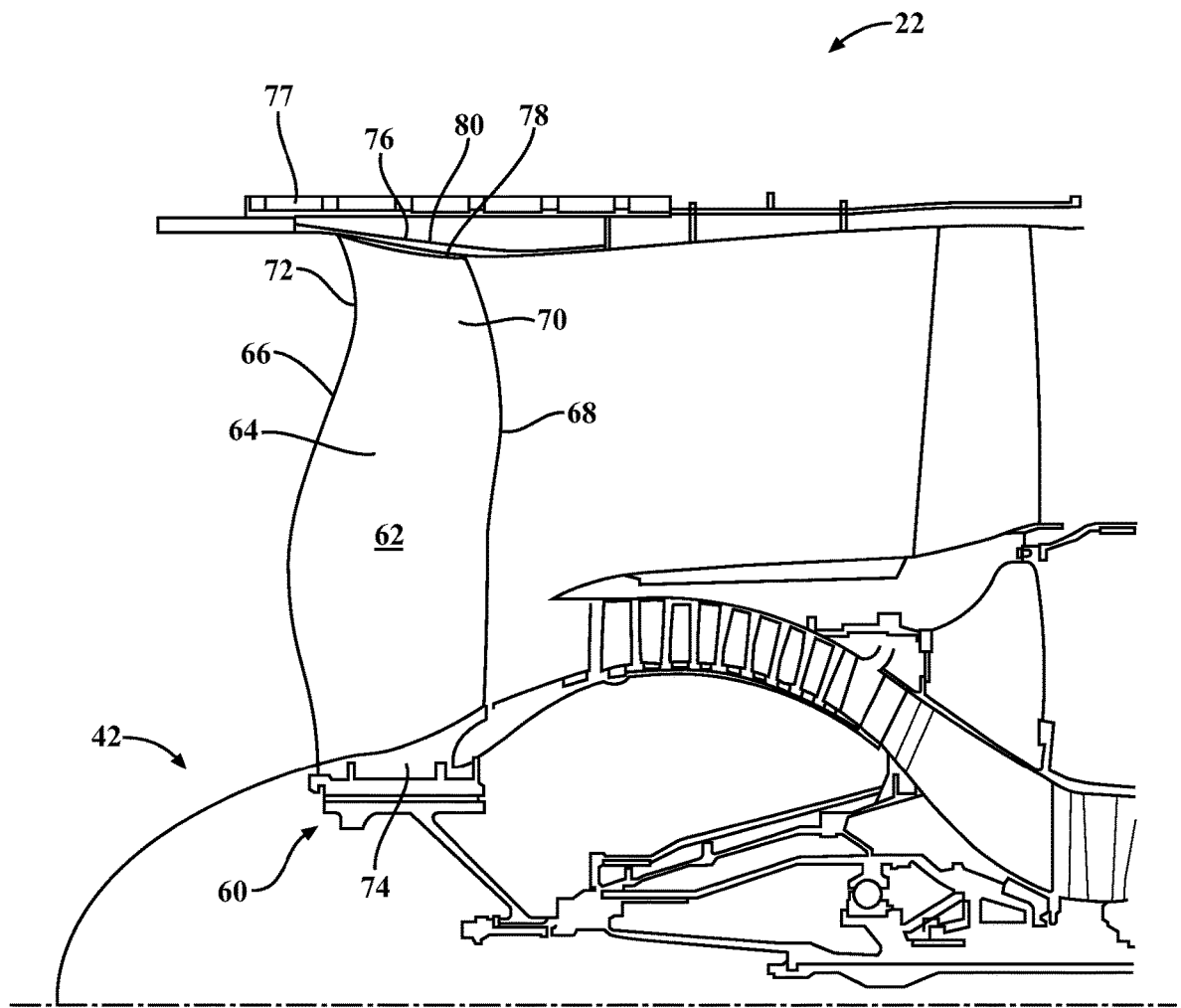
FIG. 2 is an exposed schematic cross-section of a fan section of the gas turbine engine architecture.
Figure 3:
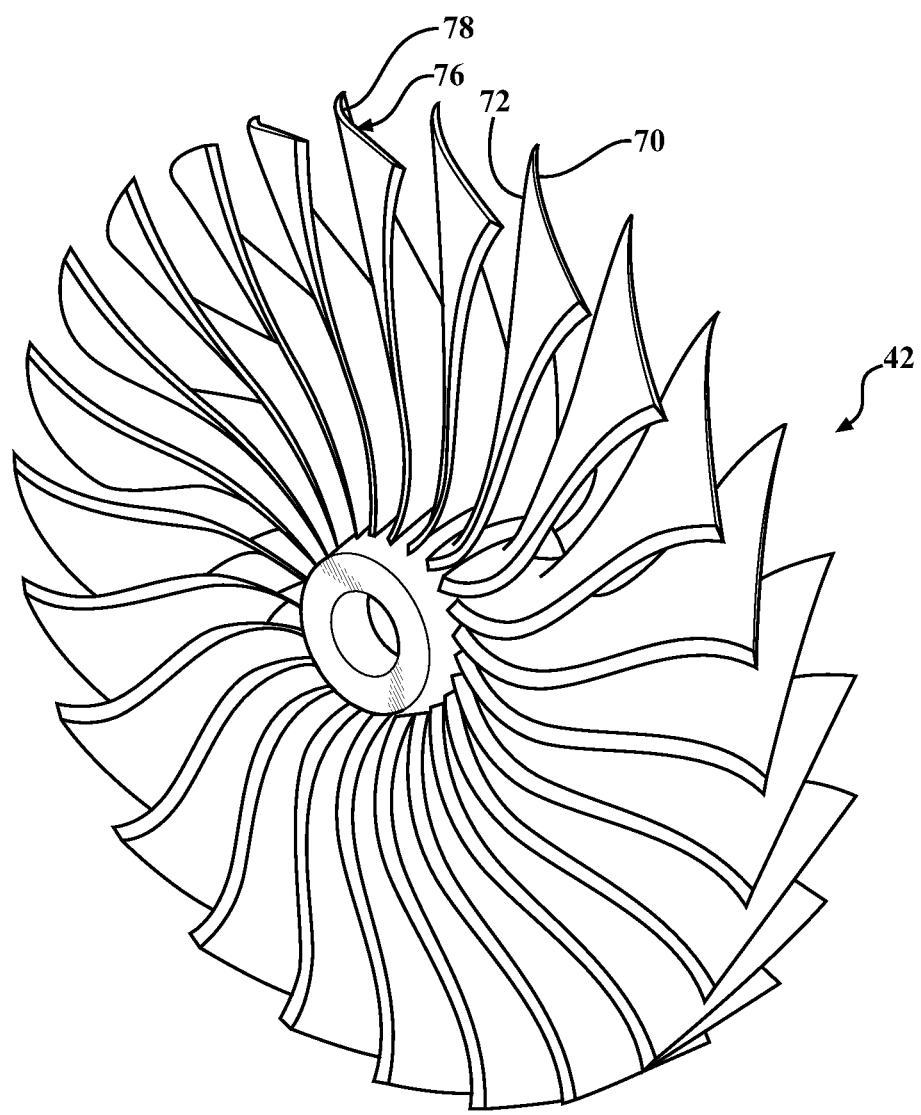
FIG. 3 is a perspective view of a fan for the engine section.

FIG. 2 illustrates an isolated view of the fan section 22 of the engine 20. The fan 42 includes a rotor 60 that supports a plurality of circumferentially-spaced blades 62. Each blade 62 includes an airfoil section 64 that extends between leading and trailing edges 66/68, first and second opposed sides 70/72 that each joins the leading and trailing edges 66/68, a root end 74, and a free end 76. Each blade includes an abrasive tip 78 at the free end 76 (FIG. 3).

The fan case 77 is annular in shape and circumscribes the blades 62. The fan section 22 is designed such that the abrasive tips 78 of the blades 62 rub against an abradable seal 80 mounted on a radially inner side of the fan case 77. The abradable seal 80 may be formed of a polymeric-based material, such as a polymer matrix composite. In one further example, the polymer matrix composite includes an epoxy matrix and silica-containing filler dispersed through the matrix. In a further example, the silica-containing filler is or includes hollow glass microspheres. An example is 3M™ Scotch-Weld™ Structural Void Filling Compound EC-3555.

When two components are in rubbing contact, at least one of the components may wear. The term "abradable" refers to the one of the two components that wears, while the other component is "abrasive" and does not wear or wears less. Thus, when the abrasive tips 78 of the blades 62 rub against the seal 80, the seal 80 will be worn whereas the abrasive tips 78 will not wear or will wear less than the seal 80. The word "abrasive" thus also implies that there is or can be contact with an abradable component.

Figure 4:
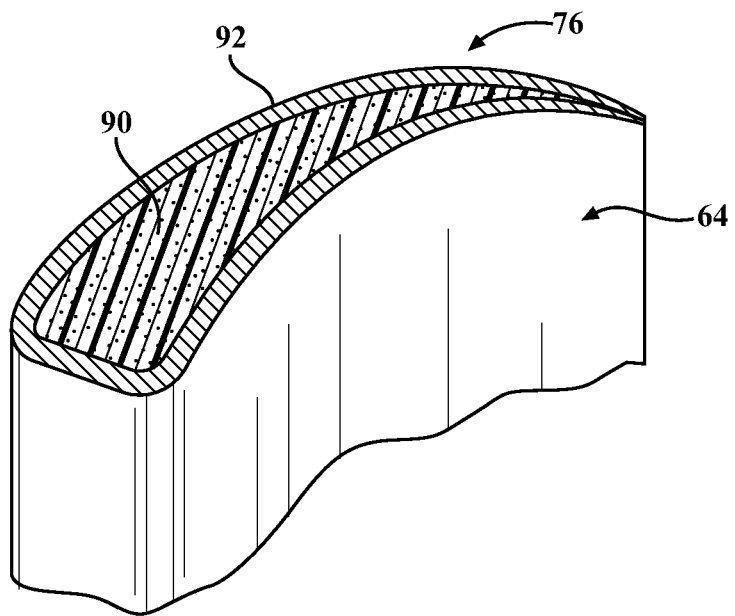
FIG. 4 is an expanded view of a blade tip according to another non-limiting embodiment.

With reference to FIG. 4, a representative portion of the airfoil section 64 includes a composite core 90 with a metallic skin 92. The composite core 90 may be manufactured of, for example, a polymer composite and the metallic skins 92 may be manufactured of, for example, Nickel, Titanium, or other metals and alloys. It should be appreciated that various constructions of the airfoil section 64 may also benefit herefrom.

Figure 5:
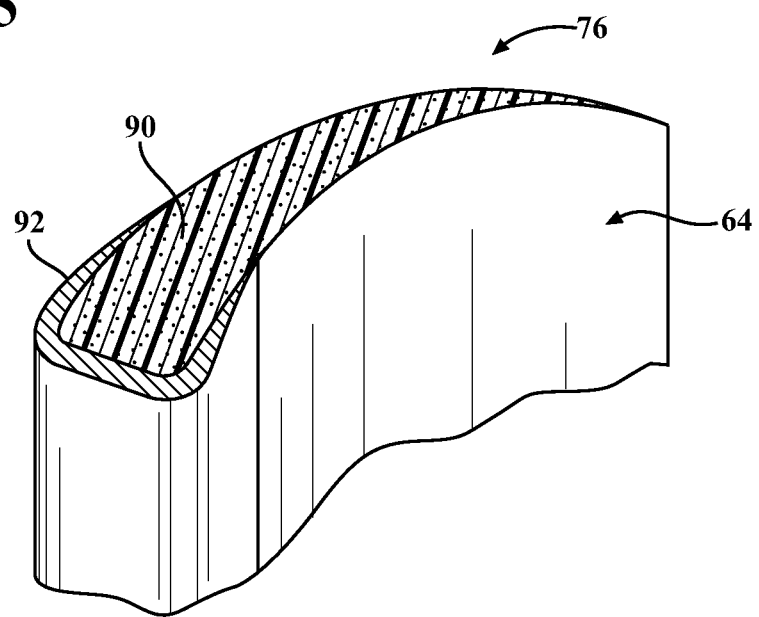
FIG. 5 illustrates an abrasive tip interfacing with an abradable seal.

In one example, the metallic skin 92 may completely sheath the composite core 90 less the tip (FIG. 4) or may sheath only the leading edge thereof (FIG. 5). The construction of the airfoil section 64 may thus result in the exposure of the composite core 90 at the free end 76. It should be appreciated that various exposed and sheathed type free ends 76 will benefit herefrom.

Figure 6:
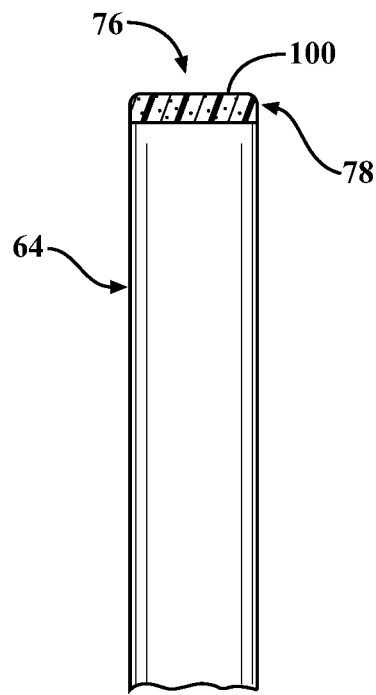
FIG. 6 is a front cross-section of an abrasive tip.

With reference to FIG. 6, an abrasive coating 100 is applied to the free end 76 to form the abrasive tip 78 to cut the abradable, prevent excessive temperature rise and prevent damage to the bond between the composite core 90 with a metallic skin 92. The abrasive coating 100 may be applied in a variety of methods and utilize a variety of materials. Further, the "free end" as defined herein includes the distal end as well as potential extension around the sides of the airfoil section 64.

In one example, the abrasive coating 100 may be a bonded abrasive coating that includes adhesive based abrasive filler to provide a polymer bond to the airfoil section 64. The bonded abrasive coating includes one or more epoxies, polyimides, polyurethanes, cyanoacrylates, acrylics, etc., and combinations thereof with suitable abrasive fillers such as zirconia, alumina, silica, cubic boron nitride (CBN), various metal alloys and mixtures thereof. One suitable abrasive is sold by Washing Mills under the trademark DURALUM ATZ II W, 220 mesh. More specifically, zirconia having an average particle size of 220 mesh may be effective, although the particle size may vary.

Figure 7:
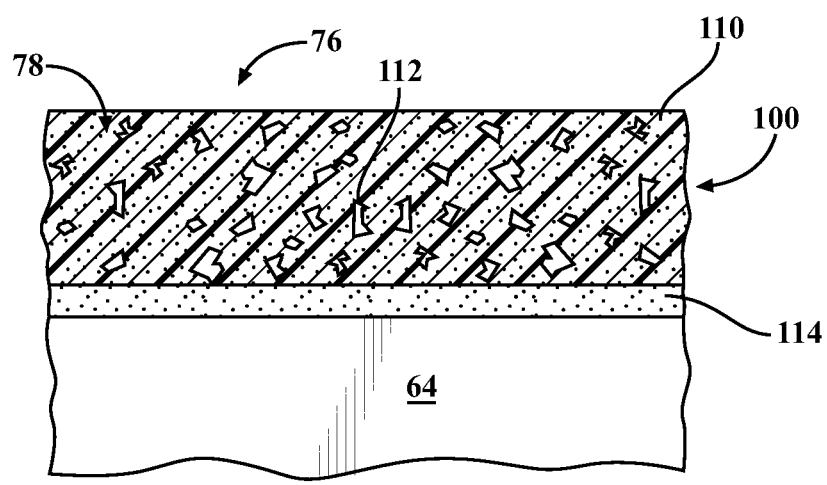
FIG. 7 illustrates a cross-section of an example abrasive material.

With reference to FIG. 7, the abrasive coating 100 may include a metal matrix 110 and hard particles 112 dispersed through the metal matrix 110. In this example, the metal matrix 110 and the metal-based material of the airfoil section 64 are compositionally composed of the same predominant metal, such as aluminum. In a further example, the metal matrix 110 is a eutectic aluminum-silicon alloy having a composition, by atomic weight, of 88% aluminum and 12% silicon. The eutectic composition provides high hardness and strength to enhance holding the hard particles 112 in the metal matrix 110. The eutectic composition also has effective high temperature properties and retains strength at high temperatures rather than softening. In a still further example, the metal matrix 110 is, or predominantly includes, aluminum, and the hard particles 112 are, or predominantly include, alumina ($Al_2O_3$). In an additional example, the hard particles 112 are, or predominantly include, zirconia ($ZrO_2$). In yet another example, the hard particles 112 are, or predominantly include, alumina and zirconia. It is to be understood that the hard particles 112 are not limited to alumina and zirconia, and other oxides, nitrides, carbides, oxycarbides, oxynitrides, diamond and combinations thereof can be used selectively.

The abrasive tip 78 can have a thickness in a thickness range of 0.025-1.3 millimeters, and the hard particles 112 can have an average maximum dimension in a particle size range of 10-200 micrometers. The hard particles 112 may protrude from the metal matrix 110 or be completely covered by the metal matrix.

In another example, a polymer matrix filled with hollow glass microspheres for the abradable seal 80 is complimentary with a metal matrix 110 of aluminum and hard particles 112 of alumina, zirconia, or both, in the abrasive tip 78. In a further example, the abrasive tip 78 includes, by volume, 0.1-50% of the hard particles 112. For the above example based on use of a polymer matrix filled with hollow glass microspheres for the abradable seal 80 and a metal matrix 110 of aluminum and hard particles 112 of alumina, zirconia, or both in the abrasive tip 78, about 5-15% hard particles 112 can be used.

The hard particles 112 may be faceted to provide relatively sharp corners that facilitate efficient "cutting" through the abradable seal 80 with low cutting forces, which lowers frictions and, in turn, contributes to lowering the amount of heat generated. In one example, the hard particles 112 are DURALUM ATZ II that has approximately 40% tetragonal zirconia with titania evenly distributed throughout the individual alumina grains.

In another embodiment, an optional bonding agent 114 facilitates bonding between the abrasive tip 78 and the airfoil section 64. In one example, the bonding agent 114 is a metallic bond coat that is located primarily between the abrasive tip 78 and the metal-based material of the airfoil section 64 and serves to enhance adhesion. For a metal matrix 110 of aluminum and a metal-based material of aluminum (of the airfoil section 64), the metallic bond coat can be, or can predominantly include, nickel and aluminum. If galvanic effects between dissimilar metals of the metallic bond coat and the abrasive tip 78 and/or airfoil portion 64 are of concern, the metallic bond coat can be excluded and a bonding agent 114 of an adhesive/sealant material can be used instead to improve corrosion resistance in the presence of moisture and also increase bonding strength.

The adhesive/sealant material can be a polymeric-based material, such as, but not limited to, an epoxy or an epoxy-based material. The adhesive/sealant material can infiltrate or partially infiltrate into pores of the abrasive tip 78 such that the abrasive tip 78, or at least a portion thereof, and the underlying airfoil section 64 are protected from corrosion. In a further example, the abrasive tip 78 can be primarily directly bonded to the metal-based material of the airfoil section 64, and the adhesive/sealant can fill or partially fill gaps or pores along the interface of the abrasive tip 78 and the underlying airfoil section 64 to further enhance adhesion. The adhesive/sealant may rapidly wear down until the abrasive tip 78 starts cutting the abradable seal 80. In further examples, the adhesive/sealant can have an overlayer thickness of 0.0254-3.175 millimeters, and in some examples a thickness of 0.254-1.27 millimeters.

The abrasive tip 78 can be a coating that is deposited onto the airfoil section 64. For example, a thermal spray technique, in which one or more feedstocks are fed into a thermal plume. The feedstock can include individual powder feedstocks of the metal matrix 110 and the hard particles 112, or a single mixed feedstock powder of the metal of the metal matrix 110 and the hard particles 112. In another alternative, the powder feedstock can include composite particles of the metal matrix 110 and the hard particles 112. Composite particles can include the metal and hard particles 112 in agglomeration or structured particles that have a hard particle core and the metal overcoated around the core. The hard particles 112 are not melted during the thermal spray deposition.

It should be appreciated that various masking methods that may include silicone thermal spray masking tape in combination with rubber sheets may be utilized to mask portions of the airfoil section 64. Masking may additionally or alternatively include shadow masking where the shadow mask is spaced apart from the tip. In shadow masking, the gun may be traversed relative to the part. During a portion of the traversal, the mask partially occludes a portion of the deposition area leading to a relatively thick coating in the center of the area, thinning toward the periphery.

Figure 8:
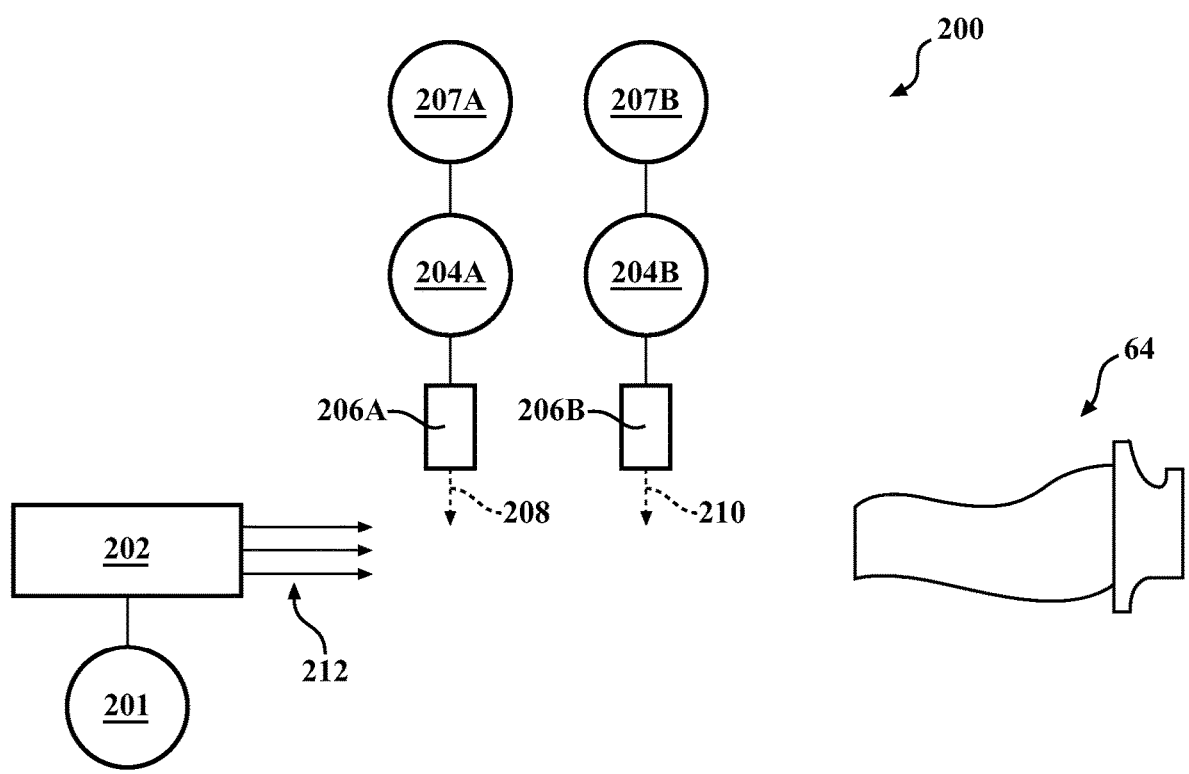
FIG. 8 illustrates a system to produce an abrasive tip according to one embodiment.

In one thermal spray example, the abrasive coating is applied by codeposition which involves simultaneous thermal (e.g., air plasma) spray of aluminum powder (for the matrix) and alumina (for the abrasive). The codeposition involves a system 200 (FIG. 8) with a single plasma gun 202 with a plasma gas source 201 and separate powder sources 204A, 204B (e.g., powder feeders with separate injection nozzles 206A, 206B coupled to carrier gas sources 207A, 207B) for introducing streams of matrix 208 and abrasive material 210 to the plasma 212. During the spray process, the aluminum and aluminum oxide particles are at least partially melted.

Figure 9:
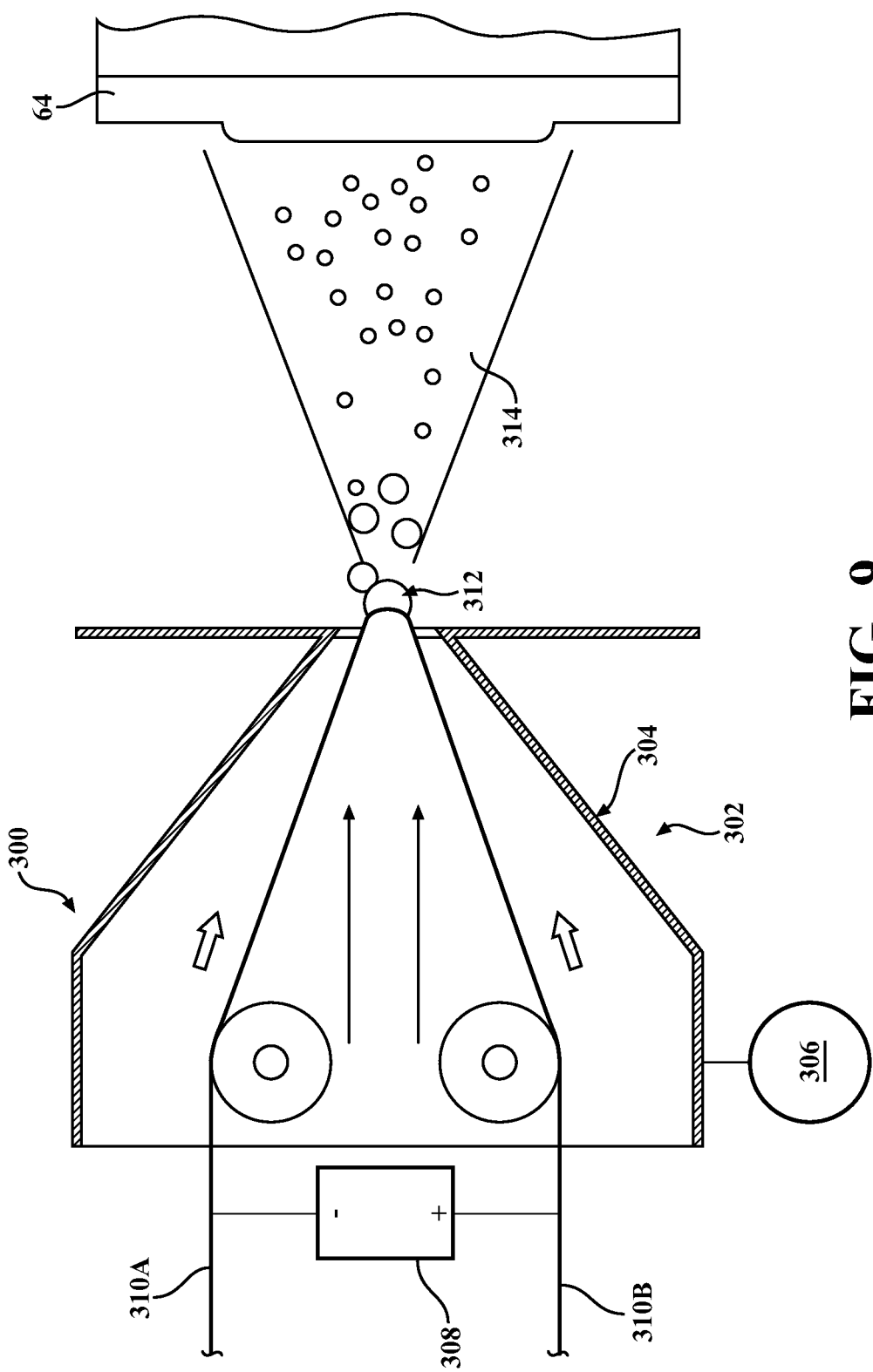
FIG. 9 illustrates a system to produce an abrasive tip according to another non-limiting embodiment.

With reference to FIG. 9, in another embodiment, the codeposition process is a twin wire arc spray processes wherein alumina cored aluminum wire is heated and melted by an electric arc and propelled as droplets (e.g., distinct droplets of alumina and aluminum) toward a surface by a gas stream. The twin wire system 300 includes a gun 302 that has a nozzle 304 and an atomizing gas supply 306. A power supply 308 applies a voltage between wires 310A and 310B which converge to form an arc 312 and discharge a droplet spray 314 toward the airfoil section 64. The exemplary wires are alumina cored aluminum. An exemplary volume fraction of alumina in the wires is at least 10%, more particularly, 20 50% or 30 50%. This leads to a similar volume percentage of the as deposited material. The powder sources of the system 200 may dispense powder in a similar ratio to yield a similar ratio in the coating.

In another embodiment, an alternative deposition process is a twin wire arc spray processes wherein an aluminum (e.g., pure aluminum) wire is heated and melted by an electric arc and propelled as droplets toward a surface by a gas stream. Through interaction with atmospheric oxygen or oxygen as a component of the atomizing gas stream, a portion of the aluminum is oxidized to form aluminum oxide during the spray process. Air may be used as the gas stream to provide the atomization, propulsion, and oxygen. In flight from the nozzle, a surface layer of each droplet will oxidize. The surface layer may have a thickness up to the full particle radius. The oxide surface layer may be molten, partially molten, or solid. Additionally, a fraction of the aluminum droplets may fully or partially solidify during flight. Upon impact with a surface, the droplets flatten and are quench cooled by thermal conduction to the already deposited coating or substrate. During this process, liquid aluminum and liquid aluminum oxide form irregularly shaped laminar or globular features in the coating. Solid or semi solid (partially molten) particles show less deformation upon impact, may fracture, or deposit as spherical particles. Particle deposition in thermal spray is a highly stochastic process. This leads to the formation of a variety of oxide geometries in the coating ranging from thin stringers to round particles, clusters of oxides, and angular fractured particles. As deposited volume proportions of oxide and metal may be as discussed above.

In still another embodiment, an alternative deposition process is air plasma spray wherein pure aluminum powder is heated and melted by a plasma stream and propelled as droplets toward a surface during which the powder at least partially oxidizes to form the abrasive phase of the coating. Exemplary feed stock powder is Metco 54NS from Sulzer Metco (US) Inc. of Westbury, N.Y. Oxidation occurs by interaction with atmospheric oxygen or oxygen as a component of the powder carrier gas stream. The alumina content of the coating can be manipulated by adjusting feed stock particle size. One or more exemplary ranges of particle size may be selected within a broader range such as 11 micrometers to 150 micrometers. Finer particles have higher relative surface area and reach higher temperature during spray. These will both result in higher alumina fraction in the coating. Additionally, the amount of available oxygen, plasma power and other spray parameters may be adjusted for the purpose of targeting a desired alumina fraction.

When using powder feed stock, as opposed to the wire in wire arc spray, a higher level of microstructural control may be achieved. For example, particle size distribution can be tailored to achieve the desired abrasive to matrix ratio in the coating. An example of particle size distribution is a bimodal size distribution. The fine and coarse size fractions are injected to the plasma stream through separate feed systems and powder ports in order to optimize particle heating and trajectory. With separate feed systems, the ratio of fine to coarse powder may be adjusted to target the desired coating properties. The fine powder will form a disproportionate fraction of the oxide while the coarse powder forms a disproportionate fraction of the metal matrix.

An example of the process uses a Sulzer Metco 3 MB spray torch with #708 nozzle operating at 30 kW with pure nitrogen plasma gas flowing at 80 SCFH. Powder feed is 25 g/minute of 10-25 micron particle size through a smaller (e.g., #2) powder port and 45 g/minute of 45 to 100 micron particle size through a larger (e.g., #4) powder port. Both powders are fed using 10 SCFH of air as carrier gas. This oxygen containing carrier gas contributes to the available oxygen in the spray plume for converting aluminum to aluminum oxide.

The abrasive coating 100 is thereby bonded onto the exposed composite core 90 at the free end 76 as well as the edge of the metallic skins 92 thereby encasing and protection the free end 76 as well as forming the abrasive tip 78.

Composite blades may suffer damage from tip heating during rub in a manner similar to polymer coated aluminum fan blades. The abrasive tips thereby reduce heat generation by the provision of localized hard particle contact and more effectively cutting the abradable. This will enable use of more wear resistant outer air seal materials and use of tighter operating clearances for improved stability and efficiency.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A fan blade, comprising:
an airfoil section formed of a composite core with a metallic skin that at least partially sheathes the composite core less a free end, wherein an end of the composite core and an end of the metallic skin forms the free end; and
an abrasive coating bonded to the free end by a bonding agent to form an abrasive tip of the fan blade, wherein the abrasive coating includes a metal matrix and hard particles dispersed through the metal matrix, the metal matrix comprised of an aluminum and the hard particles are comprised of an aluminum oxide, and the bonding agent comprised of a metallic bond coat.

2. The fan blade as recited in claim 1, wherein the abrasive tip has a thickness range of 0.025-1.3 millimeters.

3. The fan blade as recited in claim 1, wherein the hard particles have a particle size range of 10-200 micrometers.

4. A method of fabricating a fan blade, comprising:
    at least partially sheathing a composite core with a metallic skin less a free end, the composite core and the metallic skin forming an airfoil section of a fan blade, wherein an end of the composite core and an end of the metallic skin forms the free end; and
    thermal spraying an abrasive coating to the free end forming an abrasive tip of the fan blade, the abrasive coating comprises a metal matrix and hard particles dispersed through the metal matrix, wherein the thermal spraying comprises codeposition of an aluminum for the metal matrix and aluminum oxide particles for the hard particles.

5. The method as recited in claim 4, further comprising at least partially melting the aluminum.

6. The method as recited in claim 4, further comprising at least partially melting the aluminum and the aluminum oxide particles.

7. The method as recited in claim 4, further comprising melting the aluminum.

8. The method as recited in claim 4, wherein the codeposition is a twin wire arc spray process wherein alumina cored aluminum wire is heated and propelled as droplets wherein an aluminum wire casing fully melts and the alumina particles in a core of the wire at least partially melts by an electric arc.

9. The method as recited in claim 8, wherein a fraction of the droplets at least partially solidify during flight.

10. A method of fabricating a fan blade, comprising:
    at least partially sheathing a composite core with a metallic skin less a free end, the composite core and the metallic skin forming an airfoil section of a fan blade, wherein an end of the composite core and an end of the metallic skin forms the free end; and
    bonding an abrasive coating to the free end with a bonding agent to form an abrasive tip on the free end of the fan blade, the abrasive coating includes a metal matrix and hard particles dispersed through the metal matrix, the metal matrix comprised of an aluminum, the hard particles comprised of an aluminum oxide, and the bonding agent comprised of a metallic bond coat.

11. The method as recited in claim 10, wherein the abrasive coating is manufactured via a twin wire arc spray process wherein alumina cored aluminum wire is heated and propelled as droplets wherein an aluminum wire casing fully melts and the alumina particles in a core of the wire at least partially melts by an electric arc.

\* \* \* \* \*